United States Patent [19]
Müller

[11] Patent Number: 4,711,670

[45] Date of Patent: Dec. 8, 1987

[54] MOISTENING AGENT FOR OFFSET PRINTING PLATES

[75] Inventor: Walter R. Müller, Dreieich, Fed. Rep. of Germany

[73] Assignee: Firma Carl Freudenberg, Weinheim/Bergstr., Fed. Rep. of Germany

[21] Appl. No.: 799,400

[22] Filed: Nov. 19, 1985

[30] Foreign Application Priority Data

Feb. 16, 1985 [DE] Fed. Rep. of Germany ....... 3505452

[51] Int. Cl.$^4$ ...................... C08L 89/00; C08L 89/06; B41N 1/00

[52] U.S. Cl. .................................... 106/155; 106/161; 106/124; 101/461; 101/465

[58] Field of Search ...................... 106/124, 141, 155; 530/356; 101/461, 465

[56] References Cited

U.S. PATENT DOCUMENTS

| | | | |
|---|---|---|---|
| 3,042,524 | 7/1962 | Albus et al. | 106/136 |
| 3,738,913 | 6/1973 | Johnsen et al. | 530/356 |

FOREIGN PATENT DOCUMENTS 1511804 5/1978 United Kingdom .

OTHER PUBLICATIONS

International Bulletin, Jan., 1956, pp. 30–36.

Chimie et Physique Photographiques, Pierre Glafkides, pp. 300–302.

Chem. Abstract, vol. 39; 1886[8], Edwin R. Theis, 1945.

*Primary Examiner*—Theodore Morris

*Attorney, Agent, or Firm*—Felfe & Lynch

[57] ABSTRACT

A moistening agent and method for its use in offset printing plates is described. The agent contains native soluble non-crosslinked collagen and/or non-crosslinked elastin as a water-soluble organic polymer.

4 Claims, No Drawings

MOISTENING AGENT FOR OFFSET PRINTING PLATES

BACKGROUND OF THE INVENTION

The invention relates to a means for the improvement of the moistening of offset printing plates.

Offset printing or surface printing plates have the property of being hydrophilic in the nonprinting areas and hydrophobic (oleophilic) in the printing areas. In the course of the printing process, all areas are completely wetted with an aqueous moistening agent; then follows inking with the oily printing ink. The hydrophilic areas wetted by the moistening agent cannot be wetted by the hydrophobic, oily printing ink. In this manner an inked image forms on the plate, which is transferred via a rubber cylinder to the medium, i.e., the material which is to be provided with the printing.

The stability of this moistening agent film, i.e., a certain difference between the specific free surface energy of the printing plate material and the liquid, is essential to a clean distribution of the printing ink. Extensive theoretical descriptions of surface behavior, whose improvement forms the basis of the present invention, are to be found, for example, in Advances in Printing Science and Technology (Proceedings of the 17th International Conference of Printing Research Institutes, Saltsjobadan, Sweden, pp. 229–246, June 1983). Numerous attempts have been made to provide moistening agents with additives to improve wettability and hydrophilizing action. The state of the art is water-soluble synthetic and natural polymers, such as for example short-chain, even polyvalent alcohols, gum arabic, starch, alginates, dextrin, celluloses, and gelatines. In Internat. Bull. (1956, January), pp. 30–35, the use and action of these additives are described.

German published patent application No. OS 26 25 604 describes moistening agents on the basis of alcohol-and-water solutions containing univalent and polyvalent low-alkyl alcohols and glycol ethers, with molecular weights of 170 or less, in which not more than four successive carbon atoms are to be present. These moistening agents contain polyacrylamides, polyacrylic acids and their salts, together in some cases with hydroxymethyl cellulose, in an amount of 0.001 to 5% by weight. Also added are metal nitrates and organic chelating agents.

According to German examined patent application No. AS 1 105 439, the moistening agent additives consist of silicon dioxide or mixed oxides, and polyvalent alcohols and citrate buffer are added if desired. No further data are given on the nature and manner of operation of the polyvalent alcohols.

In the presence of organic polymers, the polyalcohols and short-chain, polyvalent alcohols have a tendency to form poor films, which interfere with the adsorption of the aqueous moistening agent onto the metal surface of the offset printing plates. Furthermore, these alcohols are problematical on account of their partial swelling action. Unless specific concentrations are precisely maintained, and if the atmospheric temperature and humidity fluctuate, water-soluble polymeric moistener additives of the state of the art often have a negative effect on the print quality as well as on the time the inks require for drying. Furthermore, when the printing is interrupted, their action is usually retarded so that, when the machines are started up again, long initial runs with a great deal of spotting are often necessary.

It is therefore the object of the present invention to create a moistening agent for offset printing plates, whose water-soluble polymeric components will not have the above disadvantages, and which will have a long life combined with optimum hydrophilizing and film-forming action. Also, the product is to be biodegradable.

BRIEF SUMMARY OF THE INVENTION

This object is achieved in accordance with the present patent claims.

Native, soluble collagen is well known in the art and disclosed, for example, in U.S. Pat. No. 3,991,184 (Kludas and Borchert). This collagen can be described as follows:

Native soluble collagen includes a triple helix of three spiral chains, $\alpha$, $\beta$ and $\gamma$, whose molecular weights amount to approximately 100,000, 200,000 and 300,000, respectively. The $\alpha$ chain consists of two subunits, $\alpha_1$ and $\alpha_2$, each having a molecular weight of about 100,000 and different from one another slightly in the nature of the amino acids which form them. The $\beta$ chain consists of two subunits $\beta_{11}$, which is composed of two subunits $\alpha_1$ and one subunit $\beta_{12}$ which consists of a subunit $\alpha_1$ and a subunit $\alpha_2$. The two subunits $\beta_{11}$ and $\beta_{12}$ have a molecular weight of approximately 200,000. On the other hand, depending on the method used in the extraction of the collagen, there is at the end of each helix a straight polypeptide chain, which is called a telopeptide, with a length of about 5 nm. It is an essential feature of native, soluble collagen used in the invention that it be not crosslinked by ageing or chemical treatment. Such a collagen can be obtained, as likewise disclosed in U.S. Pat. No. 3,991,184, from supporting and connective tissues.

Native soluble elastin is a non cross-linked fiber protein closely related to collagen and the chief component of the elastic fibers in sinews. It differs from collagen in the lack of the ability to swell in water and in its elastic properties. The recovery of these proteins is performed by methods well known and widely used in the cosmetic and medical arts, for example, in the German published patent application No. 28 04 024, and is not subject matter of the present invention.

The use of native soluble collagen and/or elastin, i.e., not crosslinked by ageing or other treatment, has proven surprisingly to be the solution of all of the difficulties mentioned above which occurred with the water-soluble polymers known heretofore. Extensive printing tests and measurements of surface tensions have shown that this collagen or elastin is adsorptively bound to the offset printing plate and the blanket equally, and secures an outstanding persistent hydrophilizing action of the moistening agent. Also, these polymers are absolutely nonpoisonous.

An important improvement of the adhesive quality of the moistening agent on nonprinting surfaces is achieved if the collagen and/or elastin are, at least in part, in the form of hydrolyzates. The hydrolysis of collagen is well known in the art and can be carried out by conventional techniques, e.g., alkaline, acid or enzymatic protein hydrolysis. The latter method is described in British Patent specification No. 1,414,634.

A process for the hydrolysis of water-soluble elastin hydrolyzates characterized in using acid and subsequently enzymes in alkalies, is disclosed in the German Patent specification No. 27 05 670. Both methods are not subject matters of the present invention.

Furthermore, a surprising "memory effect" for hydrophilic surface areas has been found in the moistening agent according to the invention if it contains a soluble, at least partially deamidized collagen (amide groups replaced by hydroxyl groups). In many cases, such a collagen has been found especially desirable.

In soluble, partially deamidized collagen, in accordance with German published patent application No. 25 14 844, about 30 to 60% of the amide groups of the initial collagen have been split off, the collagen having an amide nitrogen content of about 0.2 to 0.4.% by weight.

Collagen contains between 17.8 and 18.1% nitrogen, the amide nitrogen amounting to 3.8% of the total nitrogen.

By the action of alkalies or acids it is possible to achieve a more or less complete deamidation of collagen. The deamidation is based on the splitting off of ammonia from glutamine and asparagine with transformation to the corresponding acids:

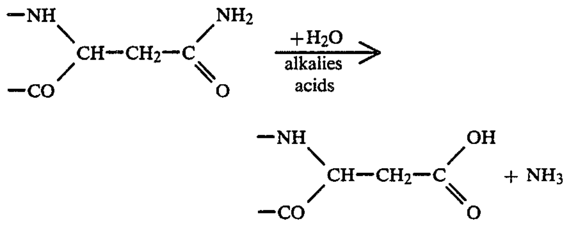

The release of carboxyl groups in the deamidation results in a shift of the isoelectric point to the acid side, an increased alkali binding capacity, and a change in the charge pattern of the collagen molecule, thereby achieving an influence on the formation of fibrils.

The "memory effect" occurs as follows: The adsorption of the moistening agent takes place preferentially on those portions of the surface on which collagen solutions were previously present. This behavior is advantageous when during the printing process the feed of moistening agent is subject to certain fluctuations (interruption of the printing process), so that in this regard a temporary undersupply to the hydrophilic surfaces can occur.

Preferably, the moistening agent according to the invention contains, under practical conditions a concentration of elastin and/or native collagen soluble in a slightly acid aqueous medium, of 0.01 to 3% of the total weight of the solution. Higher concentrations can lead to an undesirable formation of gel on the printing surface, and smaller amounts often do not have a sufficient hydrophobizing action.

The optimum pH of the moistening agent is between 4.5 and 5.5. If it is lower, the printing plate is perfectly clean; it can, however, be chemically attacked, and negative effects on paper and printing ink can appear. Also, the drying of the printing ink is retarded. At a pH above 7, a saponification of the binding agent in the printing ink usually occurs.

Known buffers, such as sodium citrate-citric acid mixture or starch citrates, have proven suitable for the stabilization of the pH.

The establishment and stabilization of the optimum surface energy of the moistening agent, i.e., its ability to produce a thin, stable and uniform film on the hydrophilic areas of the printing plate, is accomplished according to the present invention by the addition of long-chain ($6 \leqq n \leqq 12$), nonpolymer-alcohols and/or alkanediols having hydroxyl groups in the (1,2) or (1,3) position, concentrations of 0.05 to 1.0% by weight being the most advantageous. These substances in the above-stated quantity ratio also serve as antifoaming agents. Polymeric or short-chain alcohols as listed in European published patent application No. 24 289 do not show this combination of actions, or else it is necessary, as in the case of isopropyl alcohol or ethanol, to use amounts of 8 to 15% in order to establish the same surface energies as above. The values of the polar portions of the specific free surface energy are not at all achieved with these latter alcohols. Also, the alcohols according to the invention, in the above-stated amounts, produce no toxic effects at all, inasmuch as they become volatile under the practical conditions of the printing process.

Suitable alcohols are, for example, this ascending series from 1-hexanol to 1-decanol. Of the 1,2- and 1,3-alkanediols the following have proven especially advantageous:

1,2-octanediol, 1,2-decanediol, 1,2-dodecanediol,
1,3-octanediol, 1,3-decanediol, 1,3-dodecanediol.

In the use of natural organic substances there is the danger that they may be destroyed by bacteria and fungi. It is therefore advisable, and state of the art, to add to such a moistening agent commonly available antibacterial or bacteriostatic, or fungicidal or fungistatic agents in sufficient amount for preservation. Natural, biodegradable substances are known which not only stabilize the moistening agent itself but also protect the reservoirs, moisture ducts and lines of the printing machine. The use of tap water or water of standard hardness per DIN 53 910 (1 mmol $Ca^{2+}/l$) for mixing the moistening agent can lead to undesirable coatings on the printing plate due to the polyvalent metal cations the water contains. The same effect is produced at excessively high pH levels by those metal cations which collect in the moistening solution as detritus from the printing plate and moistening roll. For this reason, small amounts of known organic complexing agents such as ethylenediaminetetraacetic acid (EDTA), diethylenetriaminepentaacetic acid (DTPA) or hydroxyethylenediaminetriacetic acid (HEDTA) are added to the moistening agent according to the invention.

The moistening agent according to the invention can be applied to all conventional or alcohol- or spray-dampening rollers in the same way as known for usual agents, for example, gum arabic, carboxy-methyl cellulose or others.

The following are exemplary compositions of the moistening agent in accordance with the invention.

| Component | Parts by Weight Example 1 | Example 2 | Example 3 |
|---|---|---|---|
| Dissolved deamidized collagen | 0.1 | 0.1 | 0.1 |
| Dissolved elastin hydrolyzate | 0.02 | — | 0.01 |
| Dissolved collagen hydrolyzate | — | 0.02 | 0.01 |
| Citrate buffer | 12.00 | 10.00 | 10.00 |
| Cystine buffer | — | 4.00 | — |
| Trimethylacetate, buffer | — | — | 1.00 |
| 1,2-Dodecanediol | 0.08 | 0.08 | 0.08 |
| Preservative | 0.1 | 0.1 | 0.1 |
| pH of the ready-to-use | 4.5 | 5.0 | 5.5 |

-continued

| Component | Parts by Weight | | |
|---|---|---|---|
| | Example 1 | Example 2 | Example 3 |
| solution | | | |

It is thus easily possible to adjust the pH of the moistening agent of the invention individually according to the nature of the paper selected for printing. Nevertheless, any interruption of the printing process does not lead to any deterioration of the moist film as is usually the case when conventional moistening agents are used. The spotting produced when the printer is started up again is therefore minimal. In favorable cases, it can be restarted even without waste.

It will be understood that the specification and examples are illustrative but not limitative of the present invention and that other embodiments within the spirit and scope of the invention will suggest themselves to those skilled in the art.

What is claimed is:

1. A moistening agent for an offset printing form comprising as active component 0.01 to 3 wt.-% of at least one organic polymer selected from the group consisting of non-crosslinked elastin or native, non-crosslinked collagen in aqueous medium having a pH of from 4.5 to 5.5 and 0.05 to 1.0 weight percent of longer-chain ($6 \leqq n \leqq 12$), nonpolymeric alcohols and/or alkanediols with hydroxyl groups in the 1,2 or 1,3 positions.

2. The moistening agent of claim 1, wherein the organic polymer comprises a water-soluble hydrolyzate.

3. The moistening agent of claim 1 containing soluble, at least partially deamidized collagen.

4. The moistening agent of claim 3, containing soluble, at least partially deamidized collagen, wherein about 30 to 60% of the amide groups of the initial collagen have been split off by acids or alkalies and whose amide amide nitrogen content amounts to about 0.2 to 0.4% by weight.

* * * * *